US011718481B2

(12) United States Patent
Hogan et al.

(10) Patent No.: US 11,718,481 B2
(45) Date of Patent: Aug. 8, 2023

(54) EXTENDABLE LOADER WITH MULTIPLE CONVEYORS

(71) Applicant: FMH Conveyors LLC, Jonesboro, AR (US)

(72) Inventors: William Mark Hogan, Virginia Beach, VA (US); Barry Wayne Freeman, Norfolk, VA (US); John David Robert King, White, GA (US)

(73) Assignee: FMH Conveyors LLC, Jonesboro, AR (US)

( * ) Notice: Subject to any disclaimer, the term of this patent is extended or adjusted under 35 U.S.C. 154(b) by 242 days.

(21) Appl. No.: 17/267,900

(22) PCT Filed: Oct. 29, 2020

(86) PCT No.: PCT/US2020/057854
§ 371 (c)(1),
(2) Date: Feb. 11, 2021

(87) PCT Pub. No.: WO2022/046139
PCT Pub. Date: Mar. 3, 2022

(65) Prior Publication Data
US 2022/0306393 A1    Sep. 29, 2022

Related U.S. Application Data

(60) Provisional application No. 63/072,580, filed on Aug. 31, 2020.

(51) Int. Cl.
*B65G 21/14* (2006.01)
*B65G 21/12* (2006.01)
*B65G 13/12* (2006.01)

(52) U.S. Cl.
CPC ............. *B65G 21/14* (2013.01); *B65G 21/12* (2013.01)

(58) Field of Classification Search
None
See application file for complete search history.

(56) References Cited

U.S. PATENT DOCUMENTS

| | | |
|---|---|---|
| 4,813,526 A | 3/1989 | Belanger |
| 5,361,889 A | 8/1994 | Howell et al. |
| 6,484,868 B1 * | 11/2002 | Rowe ..................... B65G 37/02 |
| | | 198/347.1 |
| 8,944,239 B2 | 2/2015 | Campbell et al. |

(Continued)

FOREIGN PATENT DOCUMENTS

| | | |
|---|---|---|
| DE | 4006474 A1 * | 9/1991 |
| DE | 4006474 A1 | 9/1991 |

OTHER PUBLICATIONS

International Search Report and Written Opinion for Application No. PCT/US2020/057854 dated Feb. 3, 2021 (15 pages).

*Primary Examiner* — Kavel Singh
(74) *Attorney, Agent, or Firm* — Michael Best & Friedrich LLP (57) ABSTRACT

A conveyor assembly includes an extendable conveyor, a cradle configured to at least partially receive the extendable conveyor, a first conveyor that is movable between a first position and a second position, the first conveyor configured to receive a material from a first source, and second conveyor configured to receive a material from a second source. The extendable conveyor may be configured to pivot with respect to the cradle.

19 Claims, 7 Drawing Sheets

(56) References Cited

U.S. PATENT DOCUMENTS

| | | |
|---|---|---|
| 9,038,828 B2 | 5/2015 | Enenkel |
| 9,511,943 B2 | 12/2016 | Mast et al. |
| 9,517,492 B2 | 12/2016 | Schwarzbauer et al. |
| 10,294,046 B2 | 5/2019 | Hart |
| 2002/0104736 A1 | 8/2002 | Peppel et al. |
| 2003/0000803 A1 | 1/2003 | Luevano |
| 2019/0039494 A1 | 2/2019 | Carpenter et al. |

* cited by examiner

EXTENDABLE LOADER WITH MULTIPLE CONVEYORS

CROSS-REFERENCE TO RELATED APPLICATIONS

This application claims priority to U.S. Provisional Patent Application No. 63/072,580 filed on Aug. 31, 2020, the entire contents of which are incorporated herein by reference.

FIELD OF THE DISCLOSURE

The present disclosure relates to conveyors, and more particularly to extendable conveyors that may be used during material loading.

SUMMARY OF THE DISCLOSURE

The instant disclosure provides, in one aspect, a conveyor assembly including an extendable conveyor, a cradle configured to at least partially receive the extendable conveyor, a first conveyor that is movable between a first position and a second position, the first conveyor configured to receive a material from a first source, and second conveyor configured to receive a material from a second source. The extendable conveyor may be configured to pivot with respect to the cradle.

The instant disclosure provides, in another aspect, a method of conveying a first material from a first source and a second material from a second source to a load site with a conveyor assembly having a moveable conveyor, a fixed conveyor, and an extendable conveyor. The method includes conveying, on the moveable conveyor, the first material from the first source to the extendable conveyor; conveying, on the extendable conveyor, the first material to the load site; and receiving an input to switch from the first source to the second source. The method further includes sending a communication to the first source to stop sending material; raising the movable conveyor; conveying, on the fixed conveyor, the second material from the second source to the extendable conveyor; and conveying, on the extendable conveyor, the second material to the load site. The method may include detecting the first material from the first source on the moveable conveyor.

The instant disclosure provides, in another aspect, a conveyor assembly. The example conveyor assembly may comprise an extendable conveyor, a first conveyor configured to provide material from a first source to the extendable conveyor, and a second conveyor configured to provide material from a second source to the extendable conveyor. The first conveyor is movable between a raised position and a lowered position. The extendable conveyor includes a distal end and the first conveyor is positioned closer to the distal end than the second conveyor.

Other aspects of the disclosure will become apparent by consideration of the detailed description and accompanying drawings.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software-based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

DETAILED DESCRIPTION

Figure 1:
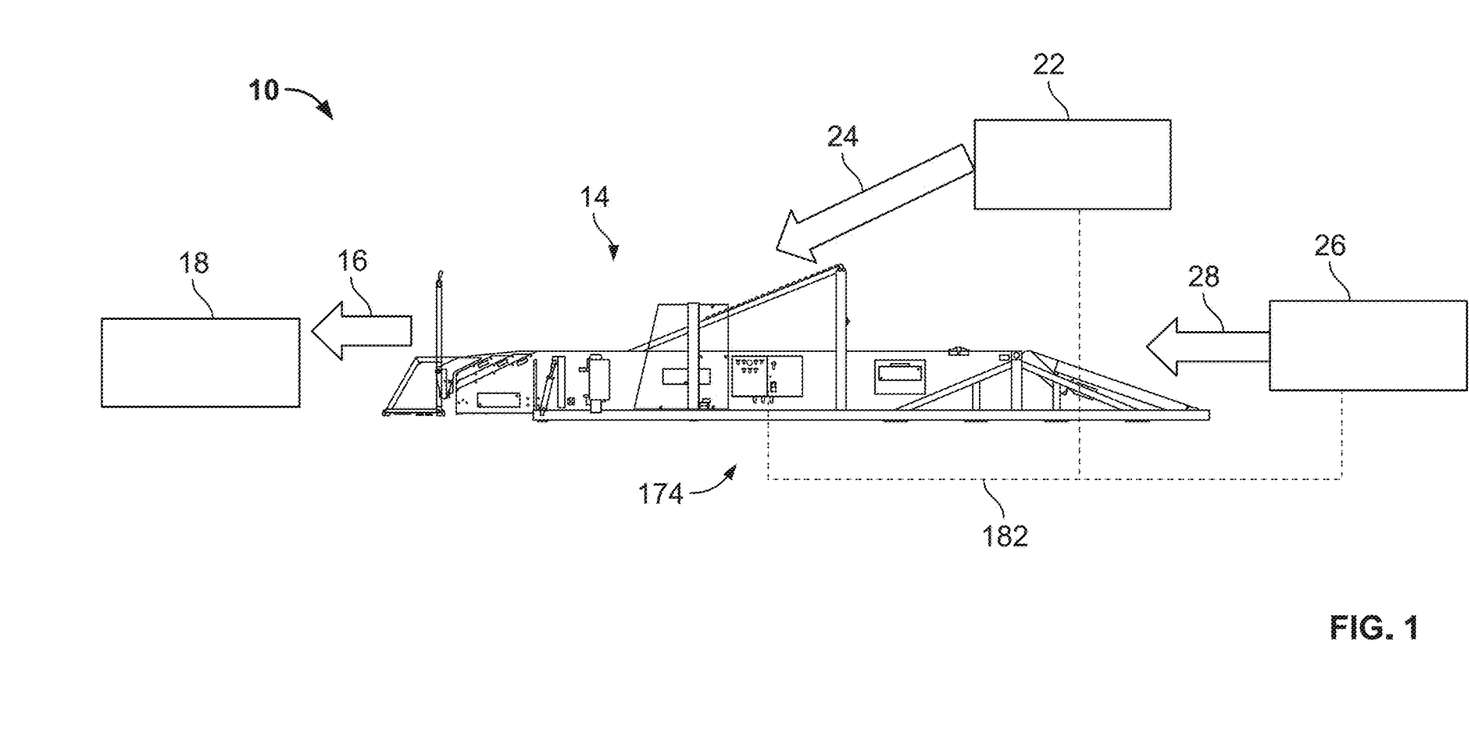
FIG. 1 is a schematic view of a loading system including a conveyor assembly according to an embodiment of the disclosure.

FIG. 1 is a schematic depiction of an exemplary loading system 10 that includes a conveyor assembly 14 that is configured to convey a flow of material 16 to a load site 18. In some embodiments, the load site 18 is a trailer of a semi-truck (e.g., FIGS. 7 and 8) and the material being conveyed are packages of various sizes.

The loading system 10 further includes a first material source 22 that provides a flow of first material 24 to the conveyor assembly 14. In some embodiments, the first material source 22 is a package sorter installed in a warehouse, fulfillment center, or distribution facility. In some embodiments, the first material source 22 provides relatively smaller-sized packages to the conveyor assembly 14. For example, the relatively smaller-sized packages may be approximately a 0.15 meter (m) cube. In various instances, smaller-sized packages may also be as small as approximately 0.33 m in length, 0.127 m in width, and 0.635 centimeters (cm) in height, and weighing approximately 0.9 kilogram (kg). In various instances, smaller-sized packages may also be as large as approximately 0.86 m in length, 0.5 m in width, and 0.2 m in height, and weighing approximately 11.3 kg. In the illustrated embodiment, the maximum size of the packages from the first material source 22 is limited by the first material source 22 itself and not the conveyor assembly 14.

The loading system 10 further includes a second material source 26 that provides a flow of second material 28 to the conveyor assembly 14. In some embodiments, the second material source 26 is fork-lift that provides packages relatively larger than the packages from the first material source 22 to the conveyor assembly 14. For example, the relatively larger-sized packages may have at least one size dimension of approximately 1.4 m. The larger-sized packages may also be as large as approximately 1.52 m in length, 0.86 m in width, and 0.84 m in height, and weighing approximately 34 kg. The larger-sized packages may also be smaller than approximately 0.86 m in length, 0.51 m in width, and 0.2 m in height, and weighing approximately 11.3 kg. In other embodiments, the second material source 26 may be a pallet jack, a person manually feeding large packages, or some other suitable way to deliver larger-sized packages to the conveyor assembly 14. In some embodiments, the second material source 26 is not pre-sorted. Typically, first material source 22 provides first material 24 to the first conveyor at a location that is different from where second material source 26 provides second material to the second conveyor.

The conveyor assembly 14 receives material from the first material source 22 and from the second material source 26, and the materials from both sources 22, 26 are conveyed to the load site 18. Although the material from the first material source 22 and the second material source 26 will described herein as "small packages" and 'large packages," respectively, the reference to the size or type of material is not limiting. In other embodiments, the first and second source of materials 22, 26 can provide any sized material, any type of material, different types of materials, etc. In various implementations, an average size of the first material 24 is less than an average size of the second material 28.

Broadly, the conveyor assembly 14 is configured to receive materials from two different sources 22, 26 and convey that material into the trailer 18. Switching between receiving material from either of the two sources 22, 26 can be automated, or semi-automated, and does not require moving the extendable conveyor 30. In other words, the extendable conveyor 30 can remain in place as the conveyor assembly 14 switches between receiving smaller packages from the first material source 22 to receiving larger packages from the second material source 26. These aspects and features can improve the efficiency of loading the trailer 18 and simplify operation of the conveyor assembly 14.

Figure 2:
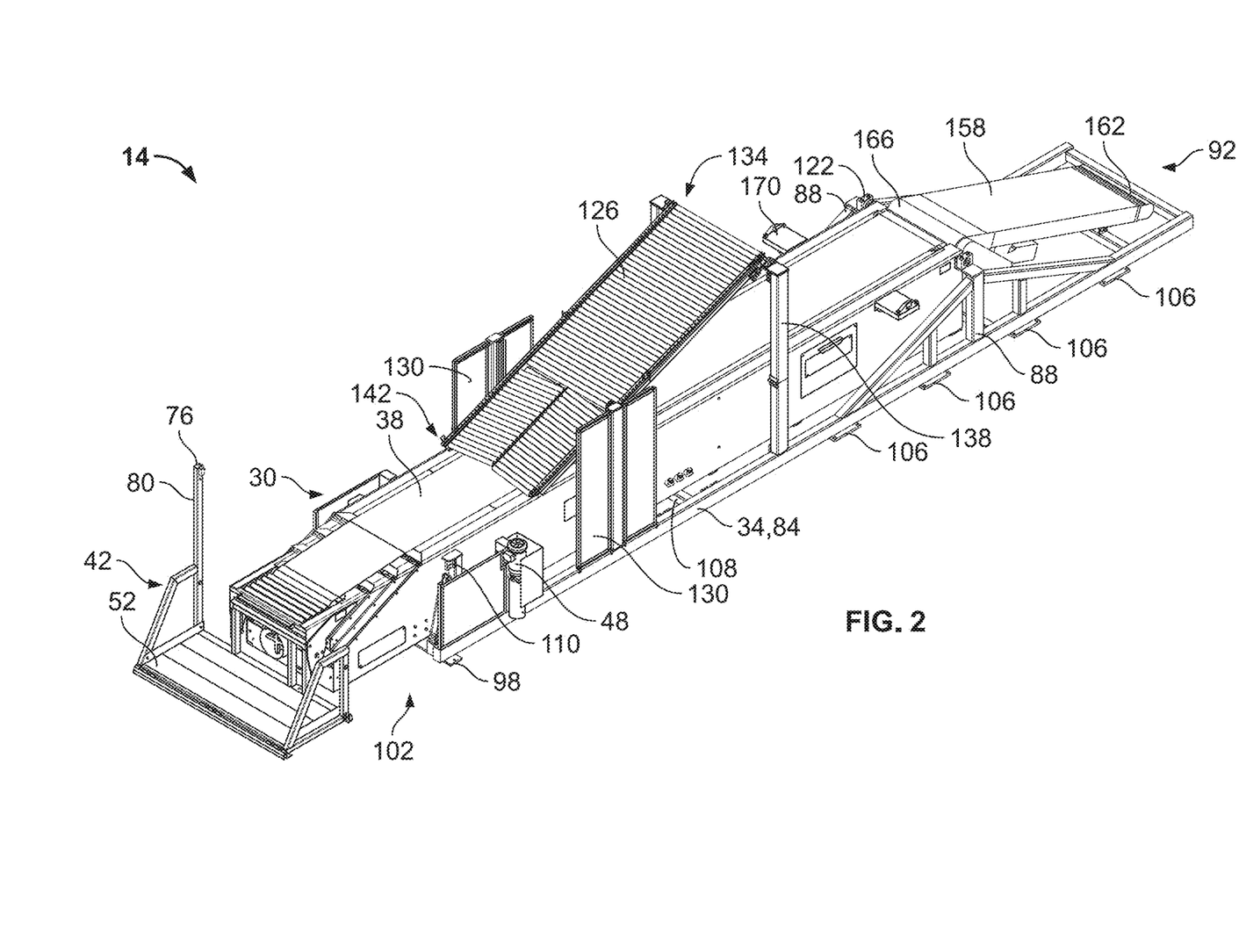
FIG. 2 is a perspective view of the conveyor assembly of FIG. 1.

With reference to FIG. 1 and FIG. 2, the conveyor assembly 14 is an assembly that includes an extendable conveyor 30 that is at least partially received within a cradle 34. The extendable conveyor 30 is configured to extend from the position shown in FIG. 2 (i.e., a retracted position) to the position shown in FIGS. 7 and 8 (i.e., an extended position). In other words, the extendable conveyor 30 may be configured to extend into a load site, such as a semi-truck trailer 18. In some embodiments, the length by which the extendable conveyor 30 is extendable by is approximately 17 meters.

The extendable conveyor 30 includes a belt 38 to transfer material in a material conveying direction 40 to a distal end 42 of the extendable conveyor 30 (i.e., the end of the extendable conveyor 30 positioned at or near the load site 18). The belt 38 and the movement of the extendable conveyor 30 between the retracted and extended positions may be driven by one or more motors, such as motor 48. In some embodiments, the motor 48 is a hydraulic motor and in other embodiments the motor 48 is an electric motor.

Figure 7:
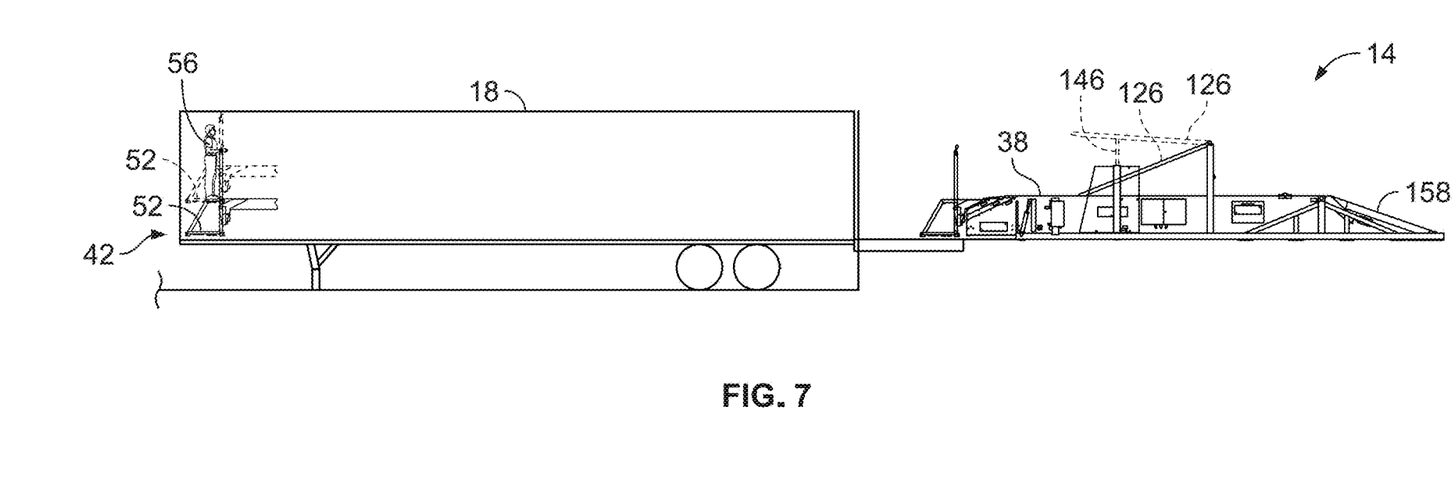
FIG. 7 is a side view of the conveyor assembly of FIG. 1, shown in an extended position within a semi-truck trailer.
Figure 8:
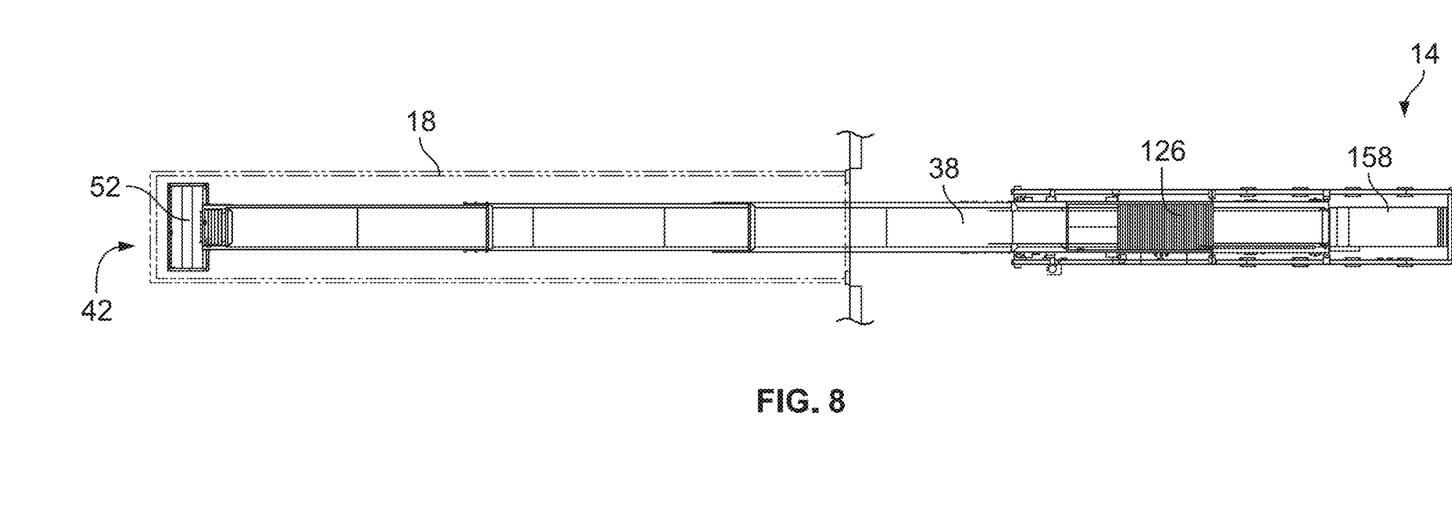
FIG. 8 is a top view of the conveyor assembly and the semi-truck trailer of FIG. 7.

With reference to FIG. 2 and FIG. 7, the extendable conveyor 30 in the illustrated embodiment includes an operator platform 52 upon which an operator 56 (FIG. 7) can stand to receive the packages from the distal end 42 of the extendable conveyor 30 and stack the packages in the semi-truck trailer 18. Possible relative heights of operator platform 52 are shown in broken lines in FIG. 7, although other heights are possible. In some embodiments, the platform 52 is removed and there is no operator present at the distal end 42. The platform 52 may also include an extension stop hinged plate sensor 60, a bottom of truck sensor 64, a rear hinged plate retract sensor 68 and a flow control 72. The platform 52 may also include a head clearance limit sensor 76 attached to a post 80 that is configured to detect a vertical clearance within the trailer 18.

Figure 3:
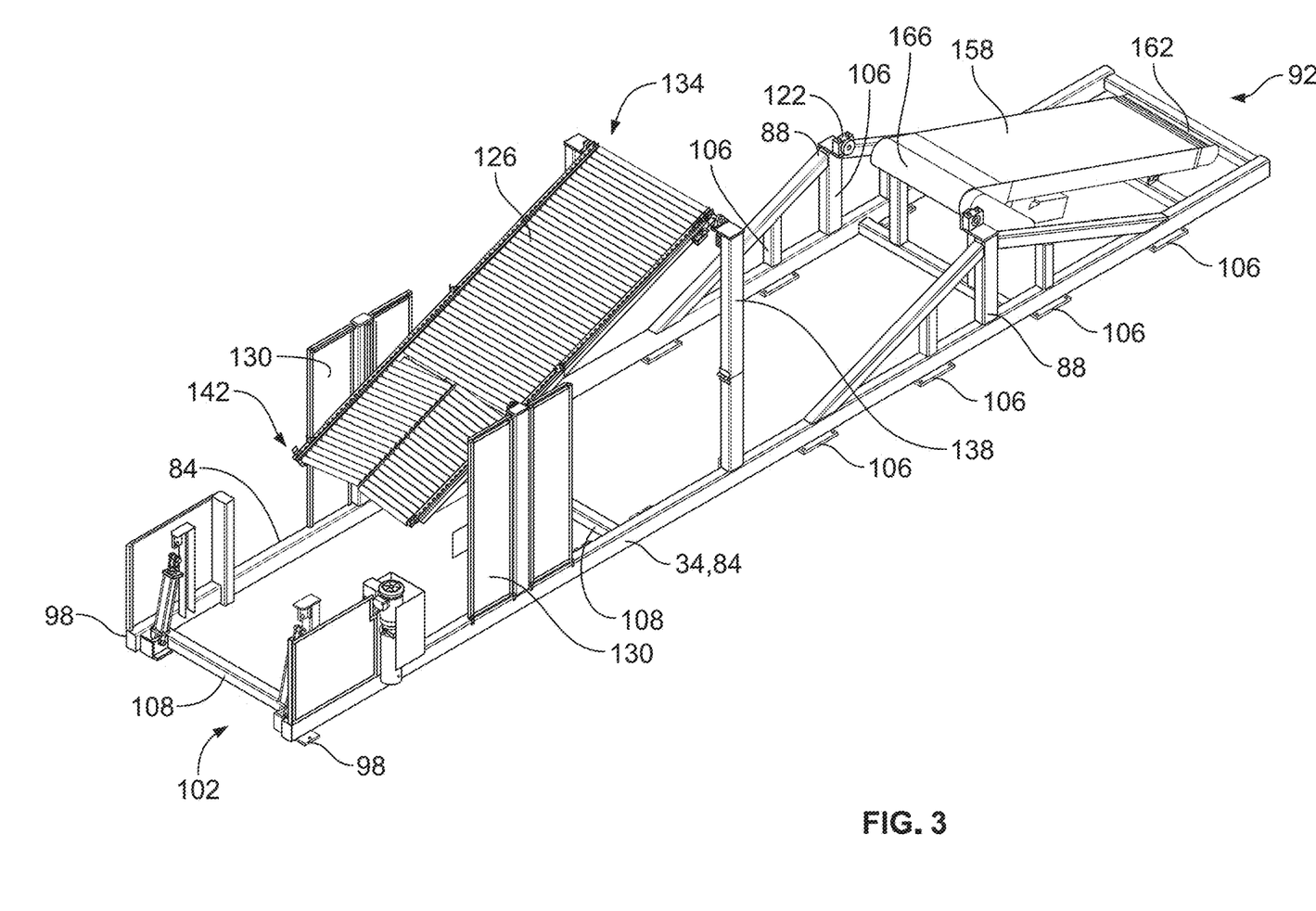
FIG. 3 is the perspective view of FIG. 2 with portions of the conveyor assembly removed.
Figure 6:
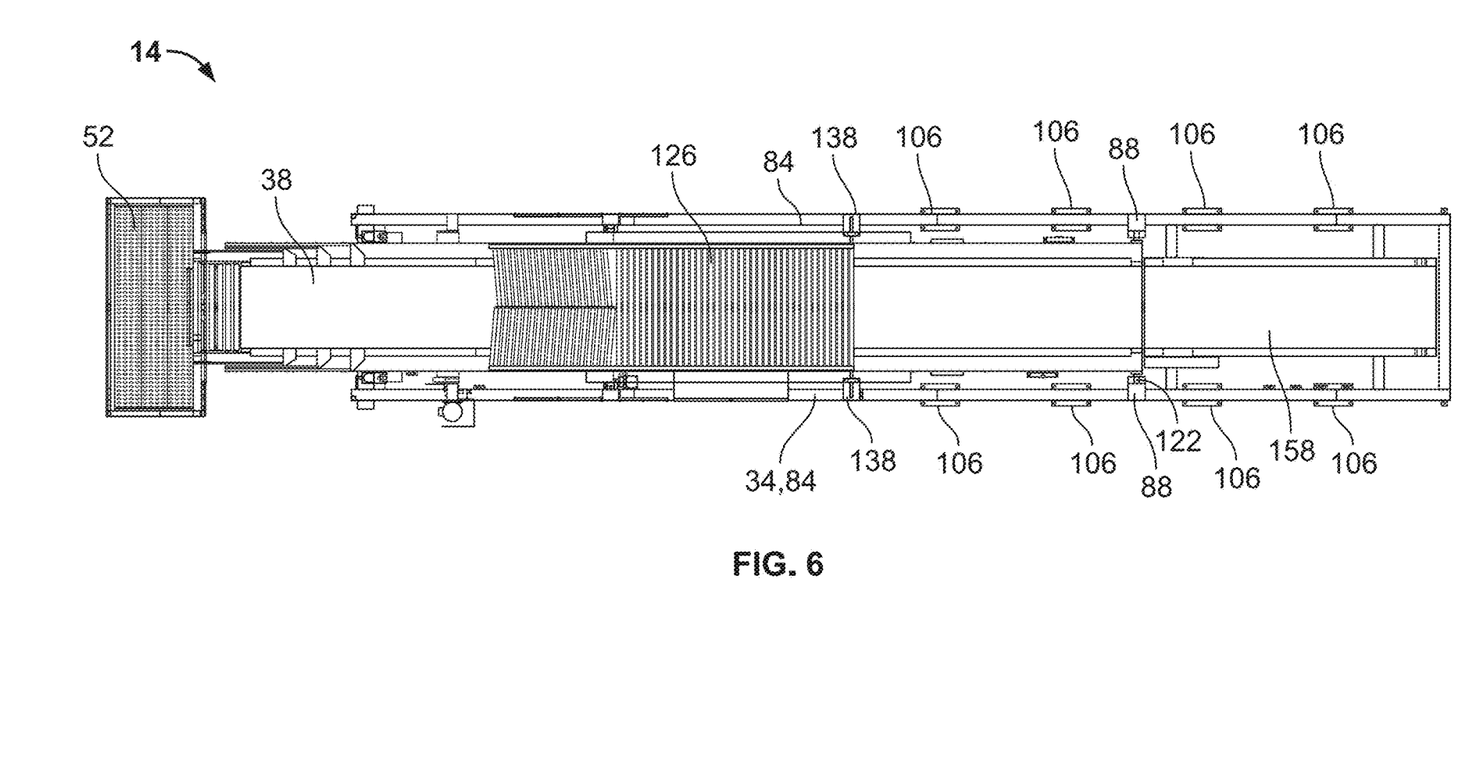
FIG. 6 is a top view of the conveyor assembly of FIG. 1.

With reference to FIGS. 2, 3, and 6, the cradle 34 includes base members 84 and trusses 88 coupled to a rear end 92 of the base members 84. A front footing 98 is coupled to a front end 102 of the base member 84. A plurality of rear footings 106 are provided at the rear end 92 of the base members 84 and associated with the trusses 88. In the illustrated embodiment, a plurality of cross bars 108 extend between the base members 84.

In the illustrated embodiment, there are four rear footings 106 associated with each truss 88. The rear footings 106 and rear trusses 88 provide a distributed load that better accommodates the loading present on the cradle 34 when the extendable conveyor 30 is fully extended. With a distributed load, the conveyor assembly 14 can be used on a variety of surfaces without damaging the underlying surface. For instance, conveyor assembly 14 may be installed on un-reinforced concrete floors.

Figure 5:
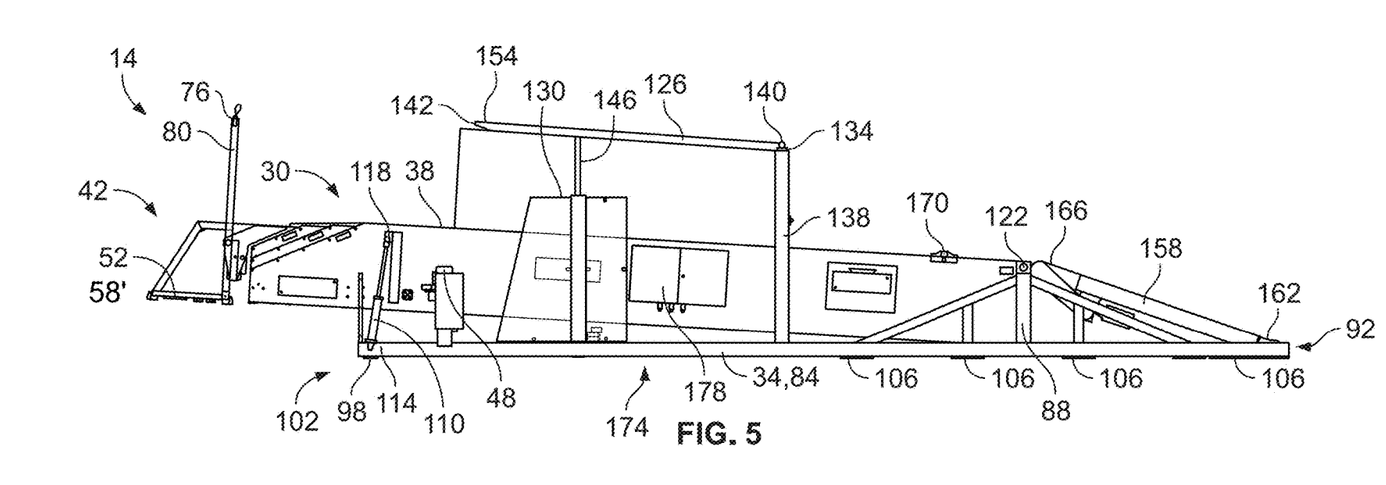
FIG. 5 is a side view of the conveyor assembly of FIG. 1 in a raised position.

With reference to FIG. 5, the conveyor assembly 14 includes an actuator 110 with a first end 114 coupled to the cradle 34 and a second end 118 coupled to the extendable conveyor 30. Activation and extension of the actuator 110 causes the extendable conveyor 30 to move (e.g., to pivot) relative to the cradle 34. In the illustrated embodiment, the extendable conveyor 30 tilts upward with respect to the cradle 34. In particular, the extendable conveyor 30 is pivotably coupled to the rear trusses 88 at a pivot 122. In other words, the actuator 110 is configured to tilt the distal end 42 of the extendable conveyor 30 upwards in order to facilitate the operator 56 stacking packages high within the trailer 18. In some embodiments, the actuator 110 is configured to raise the distal end 42 of the extendable conveyor 30 by approximately 1.47 m.

Figure 4:
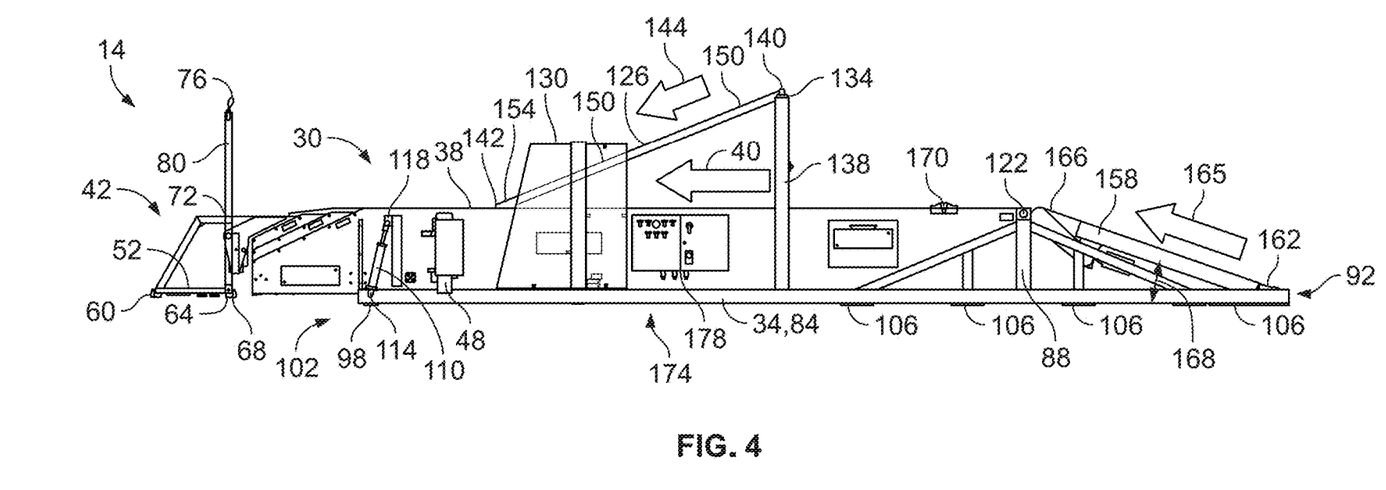
FIG. 4 is a side view of the conveyor assembly of FIG. 1

With reference to FIGS. 2-4, the conveyor assembly 14 includes a movable conveyor 126 that is configured to receive material from the first material source 22. In the illustrated embodiment, the movable conveyor 126 is a gravity-assisted roller conveyor. In other embodiments, the movable conveyor 126 is any type of suitable conveyor (e.g., a belt-driven conveyor). Guides 130 may be positioned on either side of the movable conveyor 126 to prevent material from falling off the sides of the movable conveyor 126.

The movable conveyor 126 is movable between a first position and a second position. An example first position, a lowered position, is shown in FIG. 2, FIG. 4 and FIG. 7. An example second position, a raised position, is shown in FIG. 5 and in broken lines in FIG. 7.

A first end 134 of the movable conveyor 126 is coupled to the cradle 34 by posts 138. In the illustrated embodiment, the first end 134 of the movable conveyor 126 is coupled to the cradle 34 at a pivot 140. The posts 138 extends generally vertically from the base members 84. A second end 142 of the movable conveyor 126 is movable. The second end 142 is downstream from the first end 134 in a material conveying direction 144 of the movable conveyor 126. In other words, material on the movable conveyor 126 moves from the first end 134 toward the second end 142.

With reference to FIG. 5, an actuator 146 is coupled to the cradle 34 and is controlled in order to move the movable conveyor 126 between the first position (FIGS. 2 and 4) and the second position (FIG. 5). The actuator 146 is coupled to the movable conveyor 126 at a position between the first end 134 and the second end 142. In the first position, the movable conveyor 126 is configured to receive material from the first material source 22. In the illustrated embodiment, the movable conveyor 126 is configured to receive smaller packages from the on-site package sorter and convey the smaller packages to the belt 38 of the extendable conveyor 30, which ultimately transports the packages to the distal end 42 within the trailer 18. As explained in greater detail below, the movable conveyor 126 is moved to the second position (FIG. 5) in order to provide clearance for larger packages that are being provided by the second material source 26 and transported by the extendable conveyor 30.

With reference to FIG. 4, the movable conveyor 126 can include one or more decline product present sensor 150 and an accumulation sensor 154. The decline product present sensor 150 (e.g., a photo eye sensor) is configured to detect the presence of any packages on the movable conveyor 126. The accumulation sensor 154 is configured to detect a package on the movable conveyor 126 and is utilized with indexing procedures to position packages onto the extendable conveyor 30 (i.e., moving a single package onto the belt 38 at a time).

With reference to FIGS. 2 and 4, an input conveyor 158 is configured to receive and convey large packages to the extendable conveyor 30, which ultimately transports the large packages to the distal end 42 at the load site 18. In the illustrated embodiment, the input conveyor 158 is oriented at an incline, where an angle of the incline is adjustable. The input conveyor 158 extends from a first end 162 adjacent the base members 84 to a second end 166 adjacent the belt 38 of the extendable conveyor 30. The second end 166 is downstream from the first end 162 in a material conveying direction 165 of the input conveyor 158. In other words, material on the input conveyor 158 moves from the first end 162 toward the second end 166. In the illustrated embodiment, the input conveyor 158 is oriented at an angle 168 with respect to the base members 84 of the cradle 34. In some embodiments, the angle 168 is between approximately 0 degrees and approximately 50 degrees. The input conveyor 158 is configured to receive material from the second material source 26. In the illustrated embodiment, a sensor 170 is positioned near the second end 166 of the input conveyor 158 to detect the presence of a package. In the illustrated embodiment, the sensor 170 is positioned on the belt 38 of the extendable conveyor 30 just downstream from the second end 166 of the input conveyor 158.

With reference to FIGS. 2-4, the movable conveyor 126 is positioned above and downstream of the input conveyor 158 with respect to the extendable conveyor 30. Terms to describe the relative position of the movable conveyor 126 and the input conveyor 158 are used herein such as "above" and "below" and relate to the relative vertical positioning as view, for example, from FIG. 4. With reference to FIG. 4, the movable conveyor 126 is positioned vertically above the input conveyor 158. In other words, the input conveyor 158 is positioned closer to the floor surface on which the conveyor assembly 14 rest than the movable conveyor 126. With continued reference to FIG. 4, the movable conveyor 126 is positioned downstream of the input conveyor 158. In other words, the movable conveyor 126 is positioned closer to the distal end 42 of the extendable conveyor 30 than the input conveyor 158. In the illustrated embodiment, both the first end 134 and the second end 142 of the movable conveyor 126 are positioned closer to the distal end 42 than any portion of the input conveyor 158. Stated another way, the first end 134 of the movable conveyor 126 is downstream from the second end 166 of the input conveyor 158 in the material conveying direction 40 of the extendable conveyor 30.

With reference to FIG. 4, the conveyor assembly 14 includes a control assembly 174. The control assembly 174 includes a control panel 178 with various controls. In some embodiments, the controls include a main disconnect, a system enable, an emergency stop, a warning horn, a start and stop for the belt 38, extend and retract of the extendable conveyor 30, an up and down for the actuator 146 and the movable conveyor 126, a tilt up and down for the actuator 110 and the extendable conveyor 30, and an input conveyor 158 start and stop.

Control assembly 174 may also include a processor communicatively connected to a memory via a data bus. The processor can be any of a variety of types of programmable circuits capable of executing computer-readable instructions to perform various tasks, such as mathematical and communication tasks. The memory can include any of a variety of memory devices, such as various types of computer-readable or computer storage media. A computer storage medium or computer-readable medium may be any medium that can contain or store the program for use by or in connection with the instruction execution system, apparatus, or device. In the context of the present disclosure, a computer storage medium includes at least some tangible component, i.e., the computer storage medium is not entirely consisting of transient or transitory signals.

Control assembly 174 may also include a communication unit. The communication unit operates to enable electrical communication between the control assembly 174 and other computing devices With reference to FIG. 1, the control assembly 174 may include electrical communication 182 that may enable wired communication or wireless communication with control components of first material source 22 and/or second material source 26. Example wired communication may be implanted using a wire harness. Example wireless communication may use any wireless communication technology, such as Bluetooth or Wi-Fi.

Figure 9:
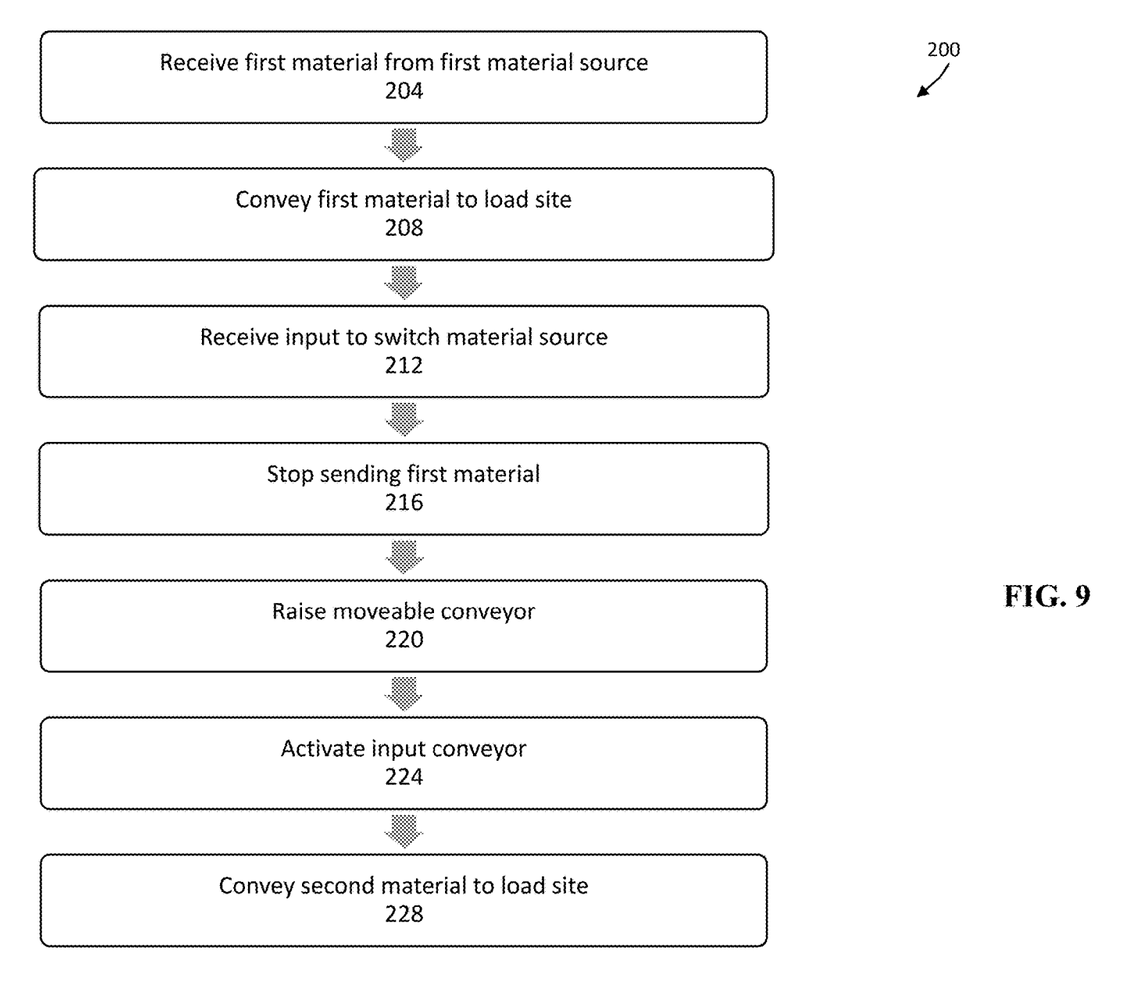
FIG. 9 is a flowchart illustrating a method of switching the conveyor assembly of FIG. 1 between receiving different sources of material.

FIG. 9 shows an exemplary method 200 of conveying material with a conveyor assembly. In some instances, method 200 may be performed using example conveyor assembly 14 shown in, and described above with reference to, FIGS. 1-8. Other embodiments can include more or fewer operations, and certain operations may be performed in a different order than that described below.

Method 200 includes receiving a first material from a first material source 22 (operation 204) and then conveying the first material to the load site 18 (operation 208). The method 200 further includes receiving an input (e.g., a button depressed by a user, output from sensor, etc.) (operation 212), which may indicate a desire to switch between the sources of material 22, 26.

After receiving an indication to switch sources, method 200 includes communicating with the first material source 22 via the electrical communication 182 to halt sending the first material to the conveyor assembly 14 (operation 216). Once the first material has cleared off the movable conveyor 126, method 200 includes activating the actuator 146 in order to move the movable conveyor 126 from the lowered position (FIGS. 2-4) to the raised position (FIG. 5) (operation 220). In some embodiments, the method 200 includes detecting the first material from the first material source 22 on the movable conveyor 126 (not shown in FIG. 9). For example, the sensor 50 may detect whether the movable conveyor 126 is clear before moving the movable conveyor 126.

With the movable conveyor 126 in the raised position, method 200 includes activating the input conveyor 158 in order to convey the second material from the second material source 26 onto the belt 38 (operation 224). In other words, operation 224 includes receiving the second material from the second material source 26. Then, the second material is conveyed to the distal end 42 of the extendable conveyor 30 and the load site 18 (operation 228).

In various instances, a memory device of control assembly 174 may include instructions that, when executed by the processor, cause the conveyor assembly to perform one or more operations described herein. An example method of initiating first conveyor or second conveyor, which may be implemented by control assembly 174, is described below. Other embodiments can include more or fewer operations.

An example method may begin upon receiving an input signal to start conveying on a first conveyor. Various operations may be performed upon receipt of such an input signal. For instance, a determination may be made about whether the second conveyor is currently operating. If the second conveyor is operating, a determination may be made whether any packages are on the second conveyor and/or the extendable conveyor. If a package is detected, the control assembly 174 may wait until some or all packages are clear of the second conveyor and/or the extendable conveyor. After the packages are clear, a signal may be sent to stop operation of the second conveyor.

Another possible operation upon receipt of an input signal to start conveying on a first conveyor is to determine whether the first conveyor is in a loading state, alternatively phrased as a lowered position. If the first conveyor is in a raised state, control assembly 174 may be programmed to send a signal to lower the first conveyor. When the first conveyor is in a lowered state, operation of the first conveyor may be initiated.

An example method may begin upon receiving an input signal to start conveying on a second conveyor. Various operations may be performed upon receipt of such an input signal. For instance, a determination may be made about whether the first conveyor is currently operating and/or receiving packages. If the first conveyor is operating and/or receiving packages, a determination may be made whether any packages are on the first conveyor and/or the extendable conveyor. This may be performed by communicating with an electronic decline product sensor. If a package is detected, another check for a package on the first conveyor may be conducted after a predetermined period of time, such as 5 seconds; 10 seconds; 20 seconds; 30 seconds; 60 seconds, or another time period. In some instances, a communication may be sent to a computing device associated with the first material source to cease sending packages to the first conveyor. In some instances, where the first conveyor is a belt conveyor, a communication may be sent to stop operation of the first conveyor.

Also determined is whether the first conveyor is in a loading state (a lowered position). If the first conveyor is in a lowered state, and there are no packages determined to be on the first conveyor, control assembly 174 may be programmed to send a signal to raise the first conveyor. When the first conveyor is in a raised state, operation of the second conveyor may be initiated.

Although the present disclosure has been described in detail with reference to certain embodiments, variations and modifications exist within the scope and spirit of one or more independent aspects of the present disclosure as described.

The invention claimed is:

1. A conveyor assembly comprising:
an extendable conveyor;
a cradle configured to at least partially receive the extendable conveyor;
a first conveyor configured to provide material from a first source to the extendable conveyor, the first conveyor being movable between a raised position and a lowered position; and
a second conveyor configured to provide material from a second source to the extendable conveyor,
wherein the conveyor assembly is configured to move the first conveyor into the raised position and switch between conveying material from the first source to conveying material from the second source.

2. The conveyor assembly according to claim 1, wherein the cradle includes a base member and a truss coupled to an end of the base member.

3. The conveyor assembly according to claim 2, wherein the cradle further includes a plurality of footings coupled to the truss.

4. The conveyor assembly according to claim 1, wherein the extendable conveyor includes a distal end and the first conveyor is positioned closer to the distal end than the second conveyor.

5. The conveyor assembly according to claim 4, further including an actuator coupled between the cradle and the extendable conveyor,
wherein the extendable conveyor is coupled to the cradle at a pivot; and
wherein activation of the actuator causes the extendable conveyor to move about the pivot.

6. The conveyor assembly according to claim 1, wherein a first end of the first conveyor is coupled to the cradle at a pivot.

7. The conveyor assembly according to claim 6, further including an actuator coupled to the first conveyor and the cradle, wherein the actuator is coupled to the first conveyor between the first end of the first conveyor and a second end of the movable conveyor.

8. The conveyor assembly according to claim 1, wherein an input portion of the first conveyor is positioned relatively higher than an input portion of the second conveyor.

9. The conveyor assembly according to claim 8, wherein a first end and a second end of the first conveyor are positioned closer to the distal end than the second conveyor.

10. The conveyor assembly according to claim 1, wherein the second conveyor is oriented at an angle with respect to a base member of the cradle.

11. The conveyor assembly according to claim 1, wherein the first conveyor includes a first end and a second end downstream from the first end in a first conveyor material conveying direction;
wherein the second conveyor includes a first end and a second end downstream from the first end in a second conveyor material conveying direction; and
wherein the first end of the first conveyor is downstream from the second end of the second conveyor in an extendable conveyor material conveying direction.

12. A method of conveying a first material from a first source and a second material from a second source to a load site with a conveyor assembly having a moveable conveyor, a fixed conveyor, and an extendable conveyor, the method comprising:
conveying, on the moveable conveyor, the first material from the first source to the extendable conveyor;
conveying, on the extendable conveyor, the first material to the load site;
receiving an input to switch from the first source to the second source;
sending a communication to the first source to stop sending material;
raising the movable conveyor;
conveying, on the fixed conveyor, the second material from the second source to the extendable conveyor; and
conveying, on the extendable conveyor, the second material to the load site.

13. The method according to claim 12, further comprising:
before raising the moveable conveyor, determining whether any first material from the first source is on the moveable conveyor.

14. The method according to claim 13, wherein an average size of the first material is less than an average size of the second material.

15. The method according to claim 13, wherein the first material is conveyed to the extendable conveyor at a location that is closer to a distal end of the extendable conveyor than an interface between the fixed conveyor and the extendable conveyor.

16. The method according to claim 15, wherein the first material is conveyed from an input portion of the moveable conveyor and the second material is conveyed from an input portion of the fixed conveyor; and
wherein the input portion of the moveable conveyor is positioned relatively higher than the input portion of the fixed conveyor.

17. A conveyor assembly comprising:
an extendable conveyor;
a first conveyor configured to provide material from a first source to the extendable conveyor, the first conveyor being movable between a raised position and a lowered position; and
a second conveyor configured to provide material from a second source to the extendable conveyor, wherein the extendable conveyor includes a distal end and the first conveyor is positioned closer to the distal end than the second conveyor,
wherein the conveyor assembly is configured to move the first conveyor into the raised position and switch between conveying material from the first source to conveying material from the second source.

18. The conveyor assembly according to claim 17, further comprising a cradle configured to at least partially receive the extendable conveyor, wherein the cradle includes a base member and a truss coupled to an end of the base member;
wherein the cradle further includes a plurality of footings coupled to the truss; and
wherein the extendable conveyor is coupled to the cradle at a pivot.

19. The conveyor assembly according to claim 18, further including an actuator coupled to the first conveyor and the cradle, wherein the actuator is coupled to the first conveyor between the first end of the first conveyor and a second end of the first conveyor; and
wherein the conveyor assembly is configured to move the first conveyor into the raised position and switch between conveying material from the first source to conveying material from the second source.

* * * * *